US012651236B1

(12) United States Patent
Lambert

(10) Patent No.: US 12,651,236 B1
(45) Date of Patent: Jun. 9, 2026

(54) VISUALLY REPRESENTING VARIOUS ATTRIBUTES OF AN ELECTRONIC MESSAGE FOR QUICK OVERVIEW

(71) Applicant: Mark Lambert, Tarpon Springs, FL (US)

(72) Inventor: Mark Lambert, Tarpon Springs, FL (US)

(73) Assignee: Lambert Mark, Tarpon Springs, FL (US)

( * ) Notice: Subject to any disclaimer, the term of this patent is extended or adjusted under 35 U.S.C. 154(b) by 0 days.

(21) Appl. No.: 19/033,413

(22) Filed: Jan. 21, 2025

(51) Int. Cl.
G06Q 10/40 (2026.01)
G06T 17/00 (2006.01)

(52) U.S. Cl.
CPC ............. G06Q 10/40 (2026.01); G06T 17/00 (2013.01)

(58) Field of Classification Search
None
See application file for complete search history.

(56) References Cited

U.S. PATENT DOCUMENTS

| | | | |
|---|---|---|---|
| 6,732,155 B2 | 5/2004 | Meek | |
| 7,219,302 B1 | 5/2007 | Oshaughnessy et al. | |
| 7,413,085 B2 | 8/2008 | Zager et al. | |
| 8,392,409 B1 | 3/2013 | Kashyap et al. | |
| 10,375,003 B1 | 8/2019 | Olsen et al. | |
| 11,138,174 B2 | 10/2021 | Semenov | |

| | | | |
|---|---|---|---|
| 11,162,071 B2 | 11/2021 | Loose et al. | |
| 11,328,265 B1 | 5/2022 | Givoly | |
| 11,526,779 B2 | 12/2022 | Bringsjord et al. | |
| 11,546,281 B1 | 1/2023 | Brown | |
| 11,710,000 B1 | 7/2023 | Cuan et al. | |
| 11,777,892 B1 | 10/2023 | Sen et al. | |

(Continued)

FOREIGN PATENT DOCUMENTS

| | | |
|---|---|---|
| CN | 1588414 A | 3/2005 |
| DE | 102005041369 B3 | 1/2007 |

(Continued)

OTHER PUBLICATIONS

ISA, International Search Report for International Application No. PCT/US2024/036178, mailed on Oct. 23, 2024, 6 pages.

(Continued)

*Primary Examiner* — Allan J Woodworth, II
(74) *Attorney, Agent, or Firm* — Perkins Coie LLP; Alberto Araiza; Lena Petrovic

(57) ABSTRACT

The system obtains emails sent to a user, an email among the emails, and a sender of the email and determines whether the sender provided an image representing the sender. Upon determining that the sender did not provide the image, the system obtains the image representing the sender. The system identifies a subset of emails, where each email in the subset of emails is from the sender. The system presents in an email interface the subset of emails along with the image representing the sender. The system obtains an indication from the user to change the image, and in response obtains images representing the sender by searching a database of images. The system presents the images to the user and obtains a selected image from the user. The system replaces in the email interface the image representing the sender with the selected image to obtain an updated email interface.

18 Claims, 10 Drawing Sheets

(56) References Cited

U.S. PATENT DOCUMENTS

| | | | |
|---|---|---|---|
| 11,947,902 B1 | 4/2024 | Grimshaw et al. | |
| 2002/0099719 A1 | 7/2002 | Schwitters et al. | |
| 2002/0138581 A1 | 9/2002 | Macintosh et al. | |
| 2003/0093483 A1 | 5/2003 | Allen et al. | |
| 2003/0135565 A1 | 7/2003 | Estrada | |
| 2003/0233419 A1 | 12/2003 | Beringer | |
| 2004/0260718 A1 | 12/2004 | Fedorov | |
| 2005/0043015 A1 | 2/2005 | Muramatsu | |
| 2005/0063365 A1 | 3/2005 | Mathew et al. | |
| 2005/0257159 A1 | 11/2005 | Keohane et al. | |
| 2005/0267944 A1 | 12/2005 | Little | |
| 2006/0072723 A1 | 4/2006 | Chung | |
| 2006/0080278 A1 | 4/2006 | Neiditsch et al. | |
| 2006/0155810 A1 | 7/2006 | Butcher | |
| 2006/0248155 A1 | 11/2006 | Bondarenko et al. | |
| 2007/0061400 A1 | 3/2007 | Parsons | |
| 2008/0046518 A1 | 2/2008 | Tonnison et al. | |
| 2008/0133501 A1 | 6/2008 | Andersen et al. | |
| 2008/0147818 A1 | 6/2008 | Sabo | |
| 2008/0183824 A1 | 7/2008 | Chen et al. | |
| 2008/0235335 A1 | 9/2008 | Hintermeister et al. | |
| 2008/0276171 A1 | 11/2008 | Sabo | |
| 2010/0271365 A1 | 10/2010 | Smith et al. | |
| 2011/0010182 A1 | 1/2011 | Williams et al. | |
| 2011/0075665 A1 | 3/2011 | Lederer | |
| 2011/0119258 A1 | 5/2011 | Forutanpour et al. | |
| 2011/0307804 A1 | 12/2011 | Spierer | |
| 2012/0030711 A1* | 2/2012 | Rae | H04N 21/466 |
| | | | 725/46 |
| 2012/0215866 A1 | 8/2012 | Satterfield et al. | |
| 2012/0221961 A1 | 8/2012 | Reynolds | |
| 2012/0297300 A1 | 11/2012 | Mahoney et al. | |
| 2013/0097121 A1 | 4/2013 | Jung | |
| 2013/0227454 A1 | 8/2013 | Thorsander et al. | |
| 2015/0012208 A1 | 1/2015 | Abrams | |
| 2015/0039566 A1 | 2/2015 | Baumann et al. | |
| 2015/0088784 A1 | 3/2015 | Dhara et al. | |
| 2015/0195232 A1 | 7/2015 | Haugen et al. | |
| 2015/0220786 A1* | 8/2015 | Folkens | G06V 10/945 |
| | | | 382/181 |
| 2015/0248429 A1 | 9/2015 | Pregueiro et al. | |
| 2015/0264004 A1 | 9/2015 | Khoo | |
| 2015/0339373 A1 | 11/2015 | Carlson et al. | |
| 2016/0011757 A1 | 1/2016 | Hoffman | |
| 2016/0026718 A1* | 1/2016 | Hopkins | G06F 16/951 |
| | | | 707/715 |
| 2016/0119260 A1 | 4/2016 | Ghafourifar et al. | |
| 2017/0031770 A1 | 2/2017 | Breedvelt-Schouten et al. | |
| 2017/0054667 A1 | 2/2017 | Brown et al. | |
| 2017/0346772 A1* | 11/2017 | Albouyeh | H04L 51/52 |
| 2018/0040303 A1 | 2/2018 | Lin et al. | |
| 2018/0091613 A1 | 3/2018 | Goel et al. | |
| 2018/0113585 A1 | 4/2018 | Shah | |
| 2018/0181378 A1 | 6/2018 | Bakman | |
| 2018/0232441 A1 | 8/2018 | Lin et al. | |
| 2018/0239495 A1 | 8/2018 | Sharifi et al. | |
| 2019/0089660 A1 | 3/2019 | Bellegarda | |
| 2019/0146474 A1 | 5/2019 | Cella et al. | |
| 2019/0146650 A1 | 5/2019 | Shah | |
| 2019/0187874 A1 | 6/2019 | Canfield et al. | |
| 2020/0026352 A1 | 1/2020 | Wang et al. | |
| 2020/0053208 A1 | 2/2020 | Kats et al. | |
| 2020/0233898 A1* | 7/2020 | Barzelay | G06F 16/24578 |
| 2020/0236081 A1 | 7/2020 | Lukas et al. | |
| 2021/0342785 A1 | 11/2021 | Mann et al. | |
| 2022/0044321 A1 | 2/2022 | Monahan et al. | |
| 2022/0158962 A1 | 5/2022 | Antonov et al. | |
| 2022/0179665 A1* | 6/2022 | Rathod | G06F 9/451 |
| 2022/0236857 A1 | 7/2022 | Sharifi et al. | |
| 2022/0263822 A1 | 8/2022 | Zager et al. | |
| 2022/0377041 A1 | 11/2022 | Lukas et al. | |
| 2022/0394005 A1 | 12/2022 | Mehta et al. | |
| 2024/0176960 A1 | 5/2024 | Maurer et al. | |
| 2024/0177119 A1 | 5/2024 | Bhatia | |
| 2024/0362826 A1* | 10/2024 | Wang | G06N 3/0455 |
| 2025/0053735 A1 | 2/2025 | Shevchenko et al. | |
| 2025/0165068 A1* | 5/2025 | Kim | G06F 3/013 |
| 2025/0175694 A1 | 5/2025 | Xu et al. | |
| 2025/0274407 A1 | 8/2025 | Lambert | |
| 2025/0274409 A1 | 8/2025 | Rieffel | |

FOREIGN PATENT DOCUMENTS

| | | | |
|---|---|---|---|
| EP | 1464014 A1 | 10/2004 | |
| EP | 1717743 A1 | 11/2006 | |
| EP | 1774708 A1 | 4/2007 | |
| EP | 2610812 B1 | 7/2015 | |
| FR | 3026504 A1 | 4/2016 | |
| JP | 2006350772 A | 12/2006 | |
| KR | 20060058903 A | 6/2006 | |
| KR | 20070057570 A | 6/2007 | |
| WO | 03060772 A1 | 7/2003 | |
| WO | 2007137323 A2 | 12/2007 | |
| WO | 2019212726 A1 | 11/2019 | |

OTHER PUBLICATIONS

Panimalar et al., "A Review of Churn Prediction Models Using Different Machine Learning and Deep Learning Approaches in Cloud Environment", Journal of Current Science and Technology, Jan.-Apr. 2023, vol. 13(1), pp. 136-161.

Goel, Ajay. "How to Create Folders in Gmail (Step-by-Step Guide)." GMass Blog, Oct. 30, 2021, www.gmass.co/blog/how-to-create-folders-in-gmail/. Accessed Apr. 3, 2026. (Year: 2021).

Heath, Catherine. "Get Organized with Gmail Labels." Keeping, Jun. 9, 2022, www.keeping. com/content/gmail-labels/. Accessed Apr. 3, 2026. (Year: 2022).

Kidson, Russell. "Organize Your Inbox with Gmail Color-Coded Labels." Softonic, Softonic EN, Jun. 14, 2024, en.softonic.com/articles/gmail-color-coded-labels. Accessed Apr. 3, 2026. (Year: 2024).

Naha, Priya. "Gmail Labels: A Guide to Keep Your Inbox Organized." ControlHippo, Jul. 9, 2024, controlhippo.com/blog/email/gmail-labels/. Accessed Apr. 3, 2026. (Year: 2024).

* cited by examiner

VISUALLY REPRESENTING VARIOUS ATTRIBUTES OF AN ELECTRONIC MESSAGE FOR QUICK OVERVIEW

BACKGROUND

Electronic mail (email) is a method of transmitting and receiving messages using electronic devices. Email is a ubiquitous and very widely used communication medium. Email operates across computer networks, primarily the Internet, and also local area networks. Today's email systems are based on a store-and-forward model. Email servers accept, forward, deliver, and store messages. Neither the users nor their computers are required to be online simultaneously; they need to connect, typically, to a mail server or a webmail interface to send or receive messages or download them. Originally an American Standard Code for Information Interchange (ASCII) text-only communications medium, Internet email was extended by Multipurpose Internet Mail Extensions (MIME) to carry text in other character sets and multimedia content attachments. The amount of email a person receives each day can be overwhelming, and a fast method of viewing the emails may be needed.

BRIEF DESCRIPTION OF THE DRAWINGS

Detailed descriptions of implementations of the present invention will be described and explained through the use of the accompanying drawings.

Figure 1:
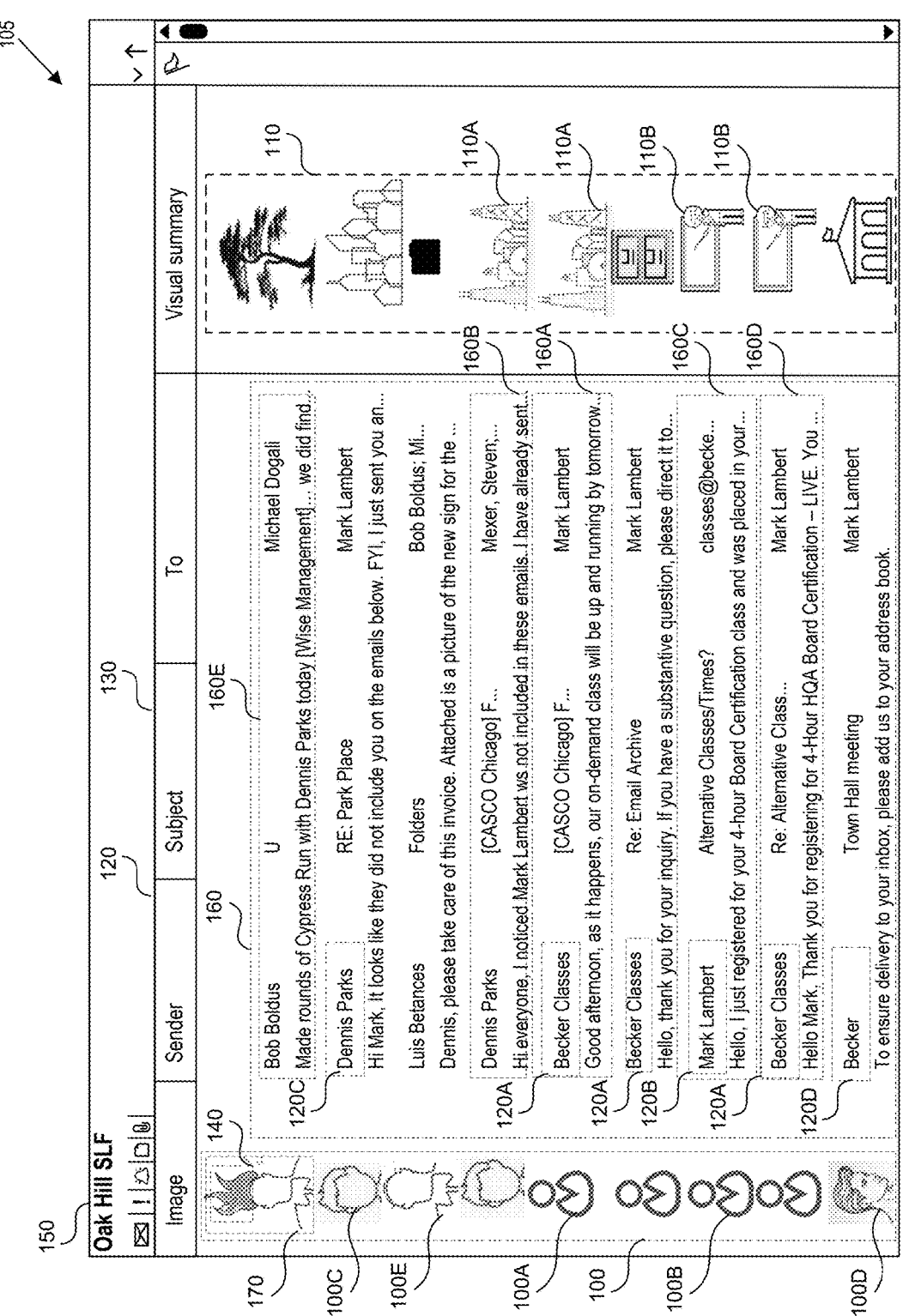
FIG. 1 shows an inbox presented by the disclosed system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology is directed to visually representing various attributes of an electronic message for quick overview. The system obtains multiple email messages sent to a user, an email message among the multiple email messages, and a sender associated with the email message and determines whether the sender provided an image representing the sender. Upon determining that the sender did not provide the image, the system obtains the image representing the sender such as a photograph of the sender or an avatar of the sender such as an emoji or a Memoji or a Genmoji. The system can obtain the image through searching the Internet for images associated with the sender or through the user's private collection of images. The system identifies a subset of email messages among the multiple email messages, where the subset of email messages includes the email message, and where each email message in the subset of email messages is associated with the sender.

The system presents in an email interface, to the user, the subset of email messages, along with the image representing the sender, and obtains an indication from the user to change the image. In response to the indication, the system obtains multiple images representing the user by searching a database of images. The database of the images can include the Internet or the user's private collection of images. The system presents the multiple images to the user and obtains a selected image from the user. The system replaces in the email interface the image representing the sender with the selected image to obtain an updated email interface. The system presents the updated email interface to the user.

Visually Representing Various Attributes of an Electronic Message for Quick Overview FIG. 1 shows an inbox presented by the disclosed system. The system 105 can create visual representations 100, 110, 140 of various electronic communication properties such as the sender 120, content 130, and/or urgency. The electronic communication 160 can include email, text messages, voice messages, video messages, etc.

To create a visual representation of the sender 120, the system 105 can determine whether the sender has already specified a visual representation, such as an image or video to represent the sender. For example, senders 120A, 120B did not specify the visual representation 100A, 100B to associate with them, while senders 120C, 120D (only two labeled for brevity) did specify the visual representation 100C, 100D to associate with them.

If the sender has specified the visual representation 100C, 100D, the system 105 can present the corresponding visual representation and the electronic communication interface, e.g., email interface, 150. However, if the sender 120A, 120B has not specified the visual representation 100A, 100B, the system 105 can obtain the visual representation in various ways. Even if the sender has specified the visual representation 100C, 100D the system 105 can enable the user to change the visual representation, as described below.

For example, the system 105 can search a database of visual representations using an application programming interface-"API", such as the Internet and/or the user's private collection of visual representations, for the sender 120A, 120B and can select a visual representation to include in place of the placeholder visual representation 100A, 100B. The system 105 can crop the retrieved visual representations to focus just on the sender.

The visual representations that the system 105 can retrieve include images, videos, three-dimensional models, as well as avatars such as emojis, Memojis, and Genmojis associated with the user. A Memoji is a customizable avatar that a user can create to look, sound, and move like the user. Memojis can be used in text messages, videoconferences, and email. A Genmoji is a custom emoji created using Apple's artificial intelligence. Users can create a Genmoji by describing what they want the emoji to look like or by using a photo of a person in their library. Genmojis can be used in Apple applications that support emojis, such as in messages, as stickers, or as Tapback reactions.

In another example, the system 105 can retrieve social media posts associated with the sender 120A, 120B and can provide the social media posts to an artificial intelligence trained to generate images based on text, audio, and/or visuals. The system 105 can obtain a generated image from the artificial intelligence and provide the generated image instead of the placeholder images 100A, 100B. More specifically, if the senders' 120A, 120B social media posts focus on the books that the sender has read, the artificial intelligence can generate an image of an owl with glasses, which the system 105 can use instead of the placeholder images 100A, 100B.

Once the system 105 presents visual representation 100 of the sender 120, the system 105 can receive an indication from the user to change a particular visual representation 100C, whether the visual representation is specified by the sender or generated by the system 105. When the system 105 receives the indication to change the visual representation 100C, the system 105 can retrieve various options for the visual presentation and can present the user with the various options that can include artificial intelligence-generated images, avatars, images, and/or videos of the user. The user can select the desired presentation, and the system 105 can update the electronic communication interface 150 to show the newly selected visual presentation next to all the messages from the particular sender.

In addition to indicating the sender, the system 105 can generate a visual representation 110 to indicate the content 130 of the electronic communication 160. The system 105 can provide the content 130 of the electronic communication 160 to an artificial intelligence configured to generate images from text. The content 130 can be a subject line and/or the body of the message. The artificial intelligence can generate images 110A, 110B (only two labeled for brevity), which the system 105 can present in the electronic communication interface 150. The generated images 110A, 110B can indicate a grouping of emails as can be seen in FIG. 1, where email messages 160A, 160B have the same visual summary 110A, and email messages 160C, 160D have the same visual summary 110B. Specifically, the generated images 110A, 110B can indicate the same email thread or can indicate the same topic across multiple email threads.

The system 105 can group email messages based on visual representations such as a visual representation 110 of the email content or the visual representation 100 of the sender. The system 105 can sort the email messages based on the visual representation or can group them in folders.

In addition to visually indicating the sender 120 in the content, the system 105 can visually indicate the urgency of the email message 160 by combining the sender visual representation 100 or the content visual representation 110 with the urgency visual representation 140. For example, the email message 160E can be indicated as urgent, and the system 105 can modify the sender visual representation 100E with the urgency visual representation 140 to obtain the new visual representation 170. In addition to generating a new image, the system 105 can generate a new short animation by, for example, animating the default visual representation 100E of the sender to make the visual representation of the sender waving arms.

Figure 2:
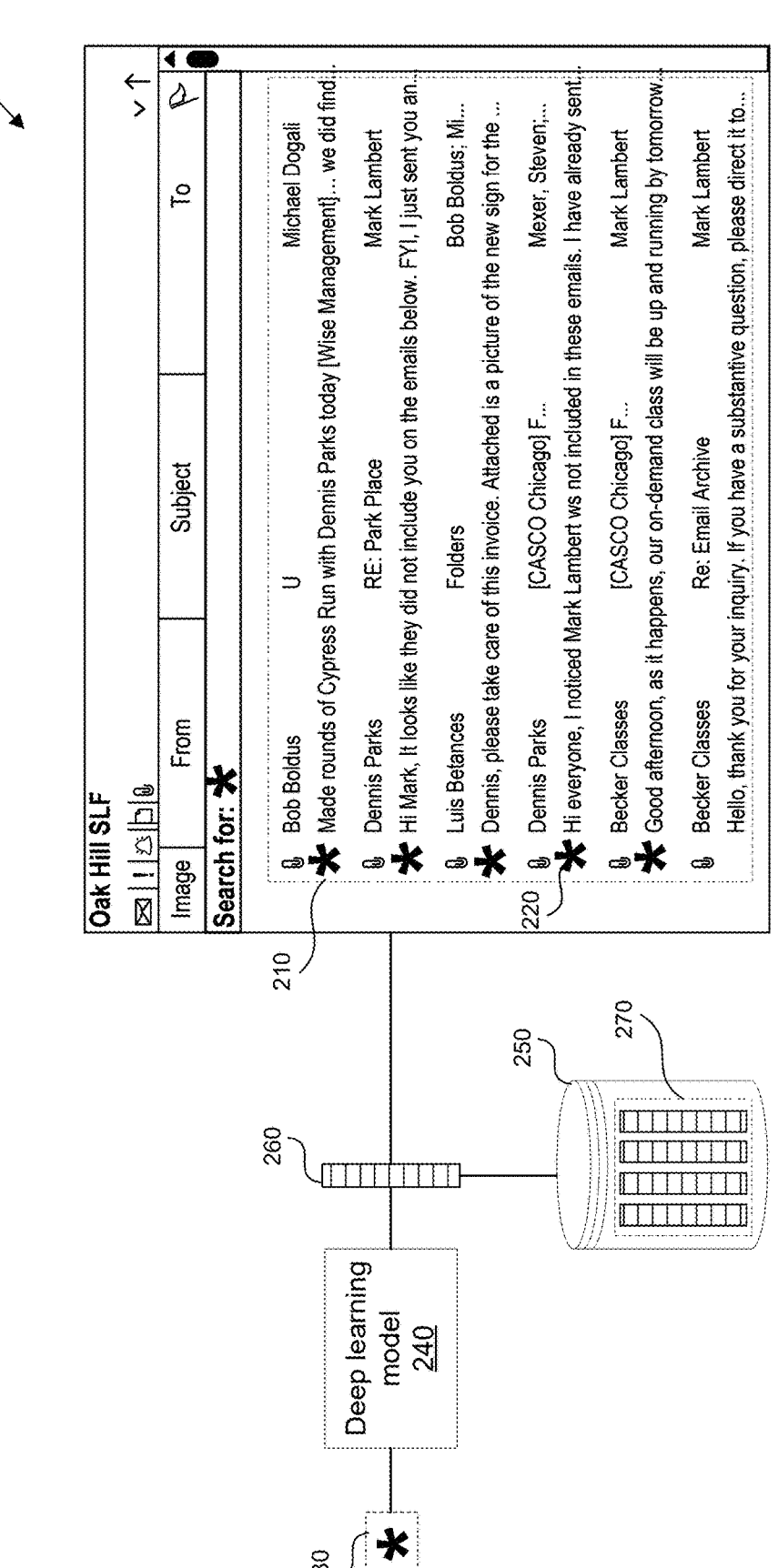
FIG. 2 shows a diagram of using images to search in group electronic communications.

FIG. 2 shows a diagram of using images to search in group electronic communications. The system 200 can enable the user to search the electronic communications 210, such as email messages, using an image search, e.g., reverse image search. A reverse image search is a technique used to find images 220 that are similar to a given input image 230.

The process begins with preprocessing the input image 230, which involves resizing the image to a standard size and normalizing the pixel values to ensure consistency. Next, the system 200 uses a deep learning model 240, such as a Convolutional Neural Network (CNN) like VGG, ResNet, or Inception, to extract a high-dimensional embedding vector 260 that represents the input image. This embedding vector captures the essential characteristics of the image.

To facilitate an efficient search, a database 250 of images is maintained, where each image 100, 110 in FIG. 1 is associated with its corresponding embedding vector 270. This database is indexed using an efficient structure, such as a KD-Tree, Ball Tree, or FAISS (Facebook AI Similarity Search), to enable fast retrieval of similar images. When performing the search, the system 200 uses a distance metric, such as Euclidean distance, Cosine similarity, or Manhattan distance, to measure the similarity between the embedding vectors of the input image and the images in the database.

Euclidean distance calculates the straight-line distance between two points in the feature space by taking the square root of the sum of the squared differences between corresponding elements of the embedding vectors. A smaller Euclidean distance indicates higher similarity. Cosine similarity measures the cosine of the angle between two vectors. It is computed as the dot product of the vectors divided by the product of their magnitudes, with values ranging from −1 to 1. A value closer to 1 signifies greater similarity, while 0 indicates orthogonality, and −1 indicates opposition. Additionally, the Manhattan distance, which sums the absolute differences between corresponding elements of the embedding vectors, is used, with smaller values indicating higher similarity.

The system 200 then conducts a nearest neighbor search to find the image 220 with the embedding vector closest to that of the input image 230. If the embedding vector of the closest image is not within a predetermined threshold to the embedding vector of the input image 230, the system can inform the user that no match has been found. Otherwise, the system shows the electronic communications 210 that are associated with the image 220 that matches the input image 230.

Figure 3:
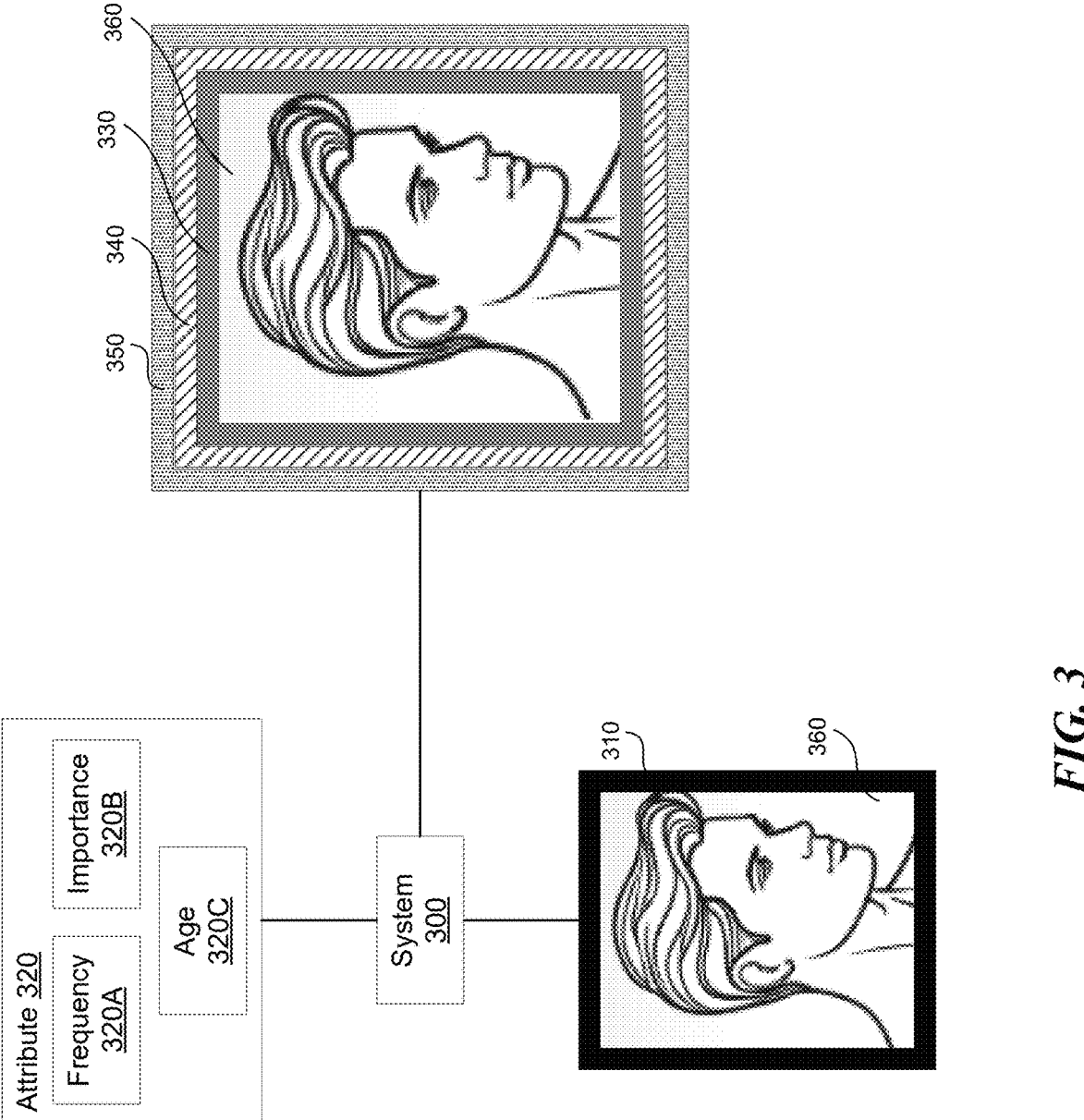
FIG. 3 shows a diagram of using the visual frame to indicate a property of an electronic communication.

FIG. 3 shows a diagram of using the visual frame to indicate a property of an electronic communication. Each visual representation 360 and 100, 110 in FIG. 1 can have a surrounding visual frame 310. The surrounding visual frame 310 can trace the shape of the visual representation 360, 100, 110. For example, if the visual representation 360, 100, 110 is square, circular, or elliptical, the surrounding visual frame 310 can have a square, circular, or elliptical shape, respectively. The default appearance of the surrounding visual frame 310 can, for example, be a solid color such as black. The system 300, however, can change the appearance of the frame 310 to indicate various attributes of the electronic communication associated with the visual representation 360, 100, 110.

The system 300 can obtain an attribute 320 associated with the electronic communication. The attribute 320 can include a frequency 320A of communication with the sender, an importance 320B associated with the electronic communication, and/or an age 320C associated with the electronic communication.

The system 300 can modify the default visual appearance in a first manner 330, a second manner 340, and/or a third manner 350. The first manner 330 indicates the frequency of communication with the sender, the second manner 340 indicates the importance associated with the electronic communication, and the third manner 350 indicates the age associated with the electronic communication.

For example, the first manner 330, second manner 340, and third manner 350 can have a unique color code such as orange, red, and blue. Alternatively, at least one of the first manner 330, second manner 340, or third manner 350 of visual representation can include an animation, such as blinking to indicate urgency, shrinking and expanding to indicate an old message that needs attention, or an animated wavy frame to indicate the frequency of communication with a particular sender.

The first manner 330, second manner 340, and third manner 350 can indicate various attributes of the electronic communication in addition to frequency, importance, or age. In addition to unique color, the first manner 330, second manner 340, and third manner 350 can use other attributes such as texture and thickness of the frame to indicate attributes associated with the electronic communication.

Figure 4A:
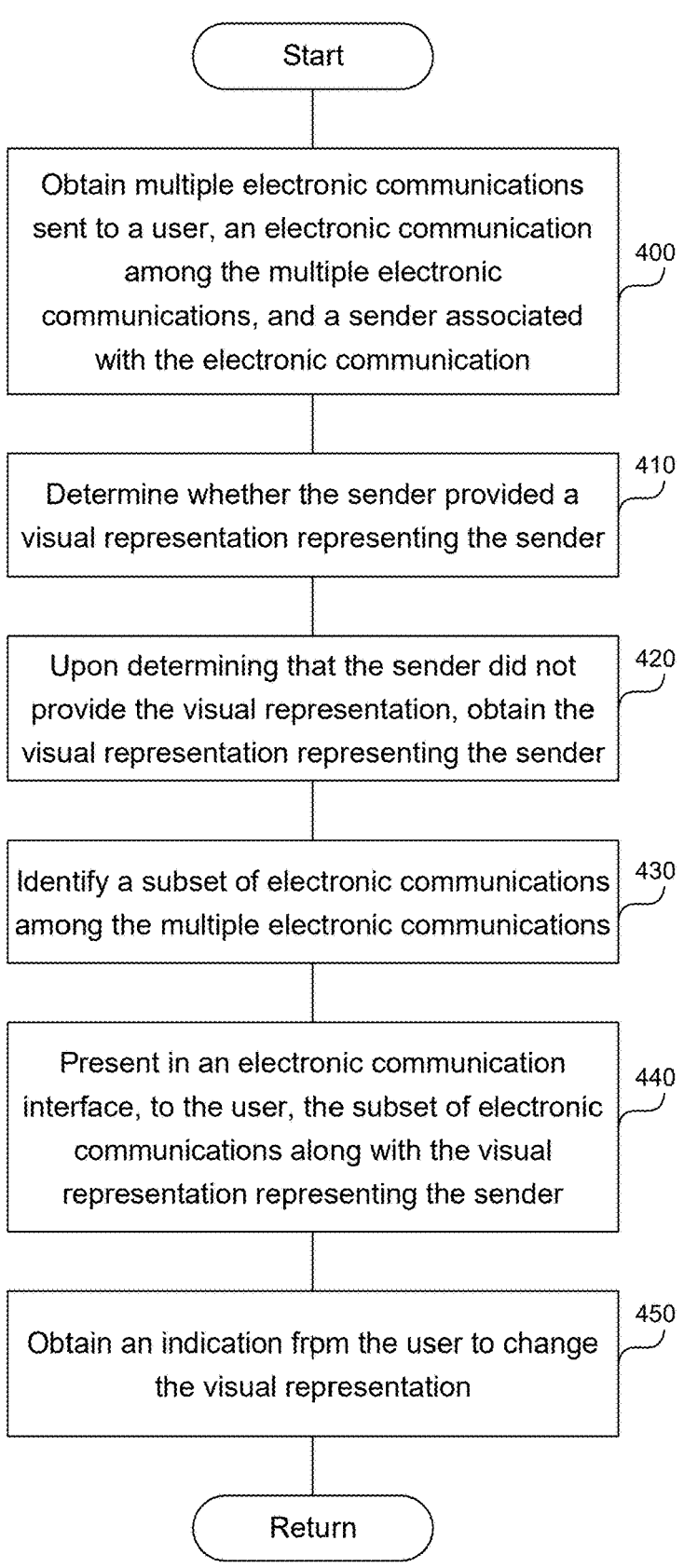
FIGS. 4A-4B show a flowchart of a method to visually represent various attributes of an electronic message for quick overview.
Figure 4B:
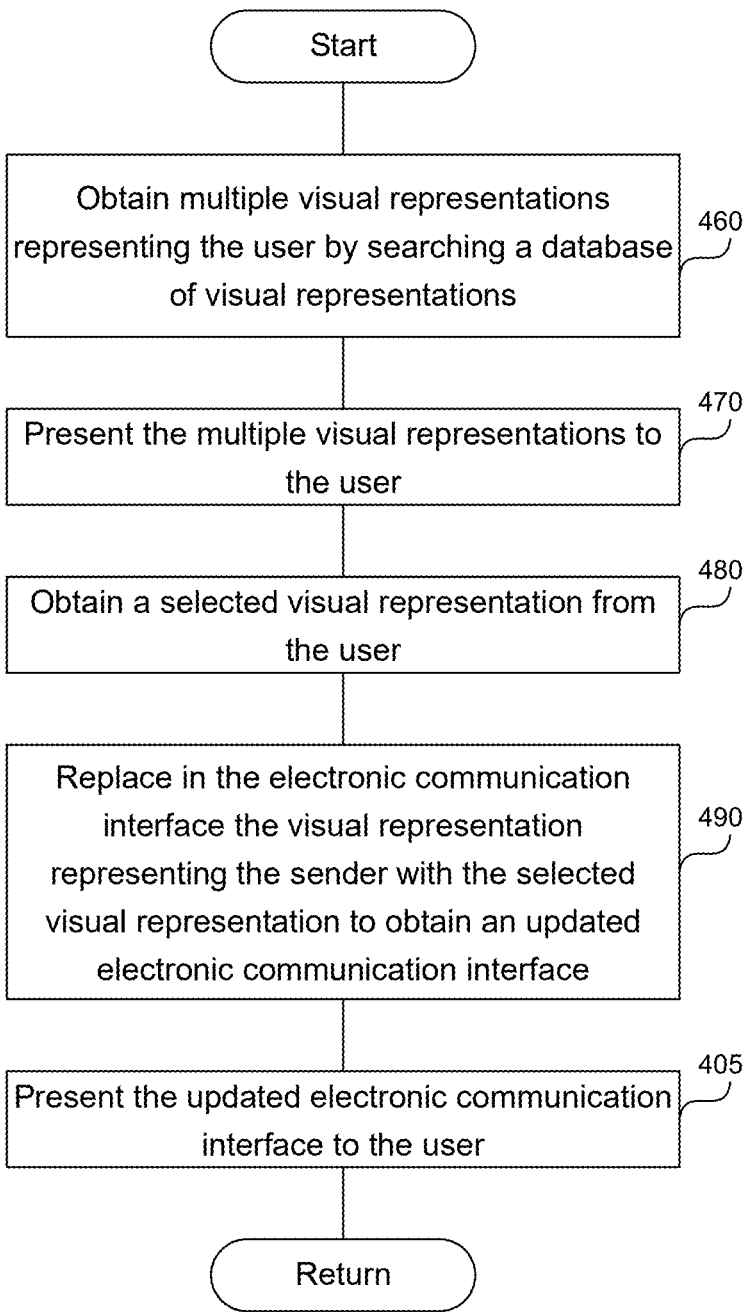

FIGS. 4A-4B show a flowchart of a method to visually represent various attributes of an electronic message for quick overview. Hardware or software processors executing instructions describing this application can visually represent various attributes of an electronic message such as sender, content, and urgency, thus enabling the user to quickly view and grasp the email message attribute without having to read.

In step 400, the processor can obtain multiple electronic communications sent to a user, an electronic communication among the multiple electronic communications, and a sender associated with the electronic communication.

In step 410, the processor can determine whether the sender provided a visual representation representing the sender.

In step 420, upon determining that the sender did not provide the visual representation, the processor can obtain the visual representation representing the sender, e.g. 100A, 100B in FIG. 1. The visual representation can be a photograph or an image associated with the sender or an avatar of the sender such as an emoji or a Memoji or a Genmoji. The processor can obtain the visual representation through searching the Internet, e.g. via LinkedIn, YouTube, Google or other search engines, for photos associated with the sender or by searching the user's private images for an image associated with the sender.

In step 430, the processor can identify a subset of electronic communications among the multiple electronic communications, where the subset of electronic communications includes the electronic communication, and where each electronic communication in the subset of electronic communications is associated with the sender.

In step 440, the processor can present in an electronic communication interface, to the user, the subset of electronic communications along with the visual representation representing the sender. In step 450, the processor can obtain an indication from the user to change the visual representation.

In step 460, the processor can obtain multiple visual representations representing the sender by searching a database of visual representations. The database can include the Internet or a private database associated with the user, such as Google photos.

In step 470, the processor can present the multiple visual representations to the user. In step 480, the processor can obtain a selected visual representation from the user. In step 490, the processor can replace in the electronic communication interface the visual representation representing the sender with the selected visual representation to obtain an updated electronic communication interface. In step 495, the processor can present the updated electronic communication interface to the user.

To obtain the visual representation representing the sender, the processor can obtain social media posts associated with the sender. The processor can provide the social media posts to an artificial intelligence trained to generate a visual representation. The processor can obtain from the artificial intelligence the visual representation representing the sender.

The processor can obtain an indication of urgency associated with the electronic communication. The processor can determine whether the indication of urgency indicates that the electronic communication is urgent. Upon determining that the electronic communication is urgent, the processor can modify the selected visual representation to include a visual indication that the electronic communication is urgent to obtain a modified selected visual representation. The visual indication can be an image of a fire, an animation of a person, such as the sender, waving or jumping up and down, or a change of a color of a frame around the visual representation. The processor can present the modified selected visual representation proximate to the electronic communication in the updated electronic communication interface.

The processor can obtain a content associated with the electronic communication. The content can be a subject line or body of the message. The processor can provide the content associated with the electronic communication to an artificial intelligence trained to generate visual representations. The processor can obtain from the artificial intelligence a second visual representation indicating the content associated with the electronic communication. The processor can present, in the updated electronic communication interface, the second visual representation. The processor can receive an indication from the user to group the multiple messages based on the visual representation or the second visual representation. The processor can group the multiple messages into multiple groups based on the visual representation or the second visual representation.

The processor can receive a second visual representation to find in the electronic communication interface. The processor can provide the second visual representation to an artificial intelligence configured to provide an embedding vector based on the visual representation. The processor can receive from the artificial intelligence an embedding vector representing the second visual representation, where the embedding vector is a numerical vector in a multidimensional space. The processor can compare the embedding vector to multiple embedding vectors representing multiple visual representations presented in the electronic communication interface to determine whether the second visual representation has a matching vector among the multiple embedding vectors. To make the comparison, the processor can compute a distance between the embedding vector and the matching vector in the multidimensional space. The distance can be Euclidean distance, Cosine similarity, or Manhattan distance, as described in this application. Upon determining that the second visual representation has the matching vector, the processor can present, to the user, the second subset of messages associated with the second visual representation in the electronic communication interface.

The processor can use frame color to indicate urgency. The processor can create a visual frame around the selected visual representation, where the visual frame includes a default visual appearance. The processor can obtain an attribute associated with the electronic communication, where the attribute includes a frequency of communication with the sender, an importance associated with the electronic communication, and/or an age associated with the electronic communication. The processor can modify the default visual appearance in a first manner, a second manner, and/or a third manner, where the first manner indicates the frequency of communication with the sender, where the second manner indicates the importance associated with the electronic communication, and where the third manner indicates the age associated with the electronic communication.

Figure 5:
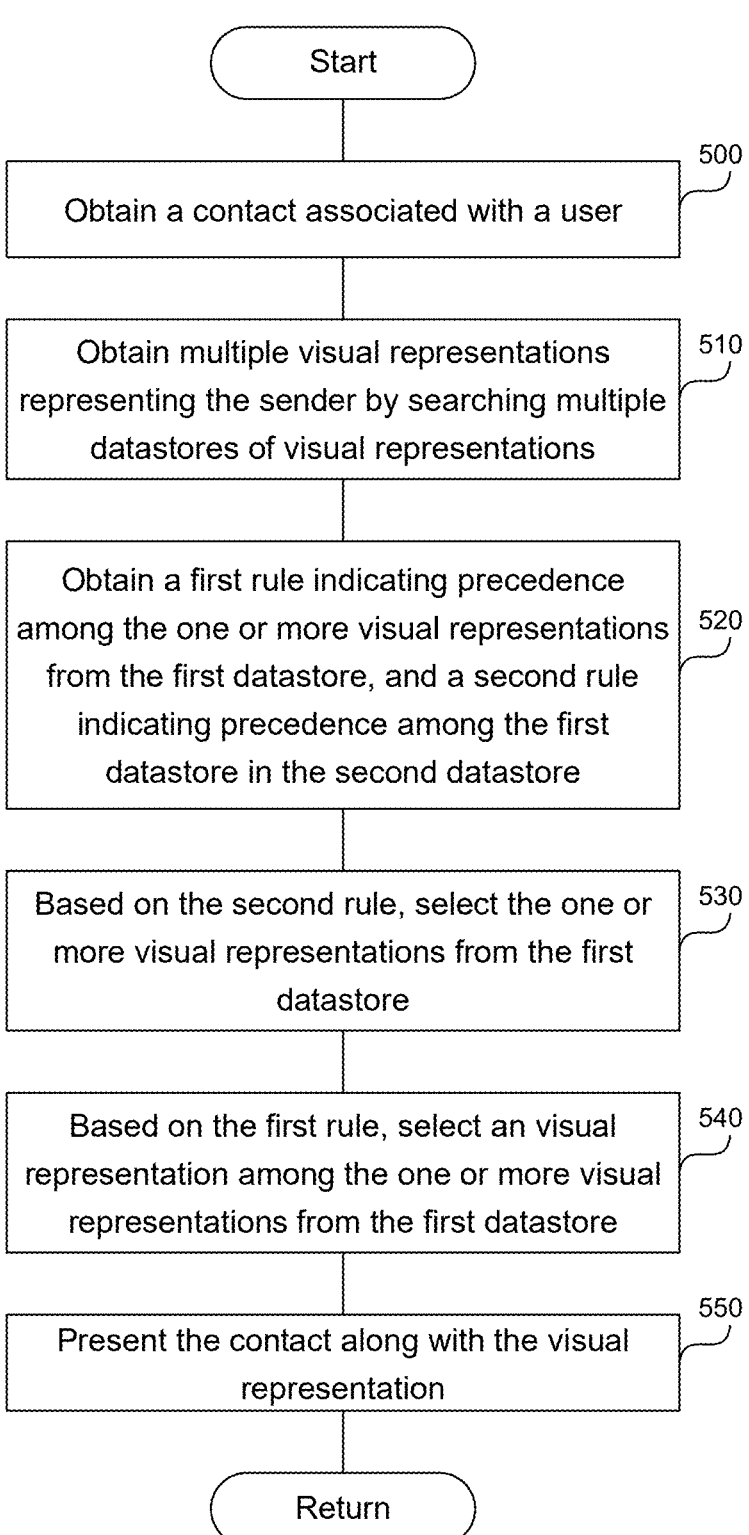

FIG. 5 is a flowchart of a method to automatically assign an image to a contact without an image. A hardware or software processor executing instructions describing this application can in step 500 obtain a contact associated with a user. The contact can be from a list of contacts, from a data store of emails, text messages, multimedia messages, social media platforms, etc.

In step 510, the processor can obtain multiple visual representations representing the contact by searching multiple datastores of visual representations, where one or more visual representations among the multiple visual representations is retrieved by searching a first datastore of visual representations among the multiple datastores of visual representations, and where a second visual representation among the multiple visual representations is retrieved by searching a second datastore of visual representations among the multiple datastores of visual representations. The data stores can be various platforms on the Internet such as first datastore can be Facebook, second datastore can be Google, third datastore can be LinkedIn, etc.

In step 520, the processor can obtain a first rule indicating precedence among the one or more visual representations from the first datastore, and a second rule indicating precedence among the first datastore and the second datastore. The first rule can indicate which visual representation to select among the one or more visual representations when there are multiple visual representations from the first datastore. The second rule can indicate that when there are one or more visual representations from the first datastore the first datastore takes precedence over the second datastore. For example, the first rule can indicate when there are multiple visual representations from the first datastore to select a visual representation among the one or more visual representations at random.

In step 530, based on the second rule, the processor can select the one or more visual representations from the first datastore. In step 540, based on the first rule, the processor can select a visual representation among the one or more visual representations from the first datastore. In step 550, the processor can present the contact along with the visual representation.

The processor can enable the user to decide when to find a visual representation for a particular contact. For example, for favorite contacts and/or VIP contacts, the user can decide on the visual representation. On the other hand, if the user indicates dissociative visual representation with all contacts, the processor can automatically assign visual representations. Specifically, the processor can determine whether the contact communicates with the user above a predetermined threshold. The predetermined threshold can be a predetermined frequency such as once a week, or can be one of the user's top 20 contacts. Upon determining that the contact communicates with the user above the predetermined threshold, the processor can provide to the user at least a subset of the multiple visual representations. The processor can receive, from the user, a second visual representation among the multiple visual representations. The processor can present the contact along with the second visual representation.

The processor can obtain a second contact associated with a user, and determine whether the second contact is associated with a third visual representation that is not a default place-holder visual representation. Upon determining that the second contact is not associated with the third visual representation, the processor can determine whether the second contact communicates with the user above a predetermined threshold. The predetermined threshold can be a predetermined frequency such as once a week, or can be one of the user's top 20 contacts. The processor can obtain a third multiplicity of visual representations representing the second contact. The processor can present the second contact along with the third multiplicity of visual representations, thus enabling the user to select a visual presentation.

In some cases, the user may want the same visual representation for more than one contact. For example, the user may want all contacts working at the same corporation to receive a corporate logo in lieu of individual visual representations. Specifically, the processor can obtain multiple contacts including the contact. The processor can identify a group of contacts among the multiple contacts, where each contact among the group of contacts includes a matching attribute such as the same place of employment, same graduation year, same alma mater, same club membership, etc. The processor can obtain a visual representation associated with the matching attribute by searching the multiple datastores. The processor can present each contact among the multiple contacts along with the visual representation associated with the matching attribute.

The processor can obtain a social media post associated with the contact, and provide the social media post to an artificial intelligence trained to generate a visual representation. The processor can obtain from the artificial intelligence the visual representation representing the contact.

The processor can present the contact along with the visual representation on a virtual reality, augmented reality, or mixed reality device. The processor can obtain the indication from the user to change the visual representation from a wand device associated with the virtual reality, augmented reality, or mixed reality device.

Transformer for Neural Network

Figure 6:
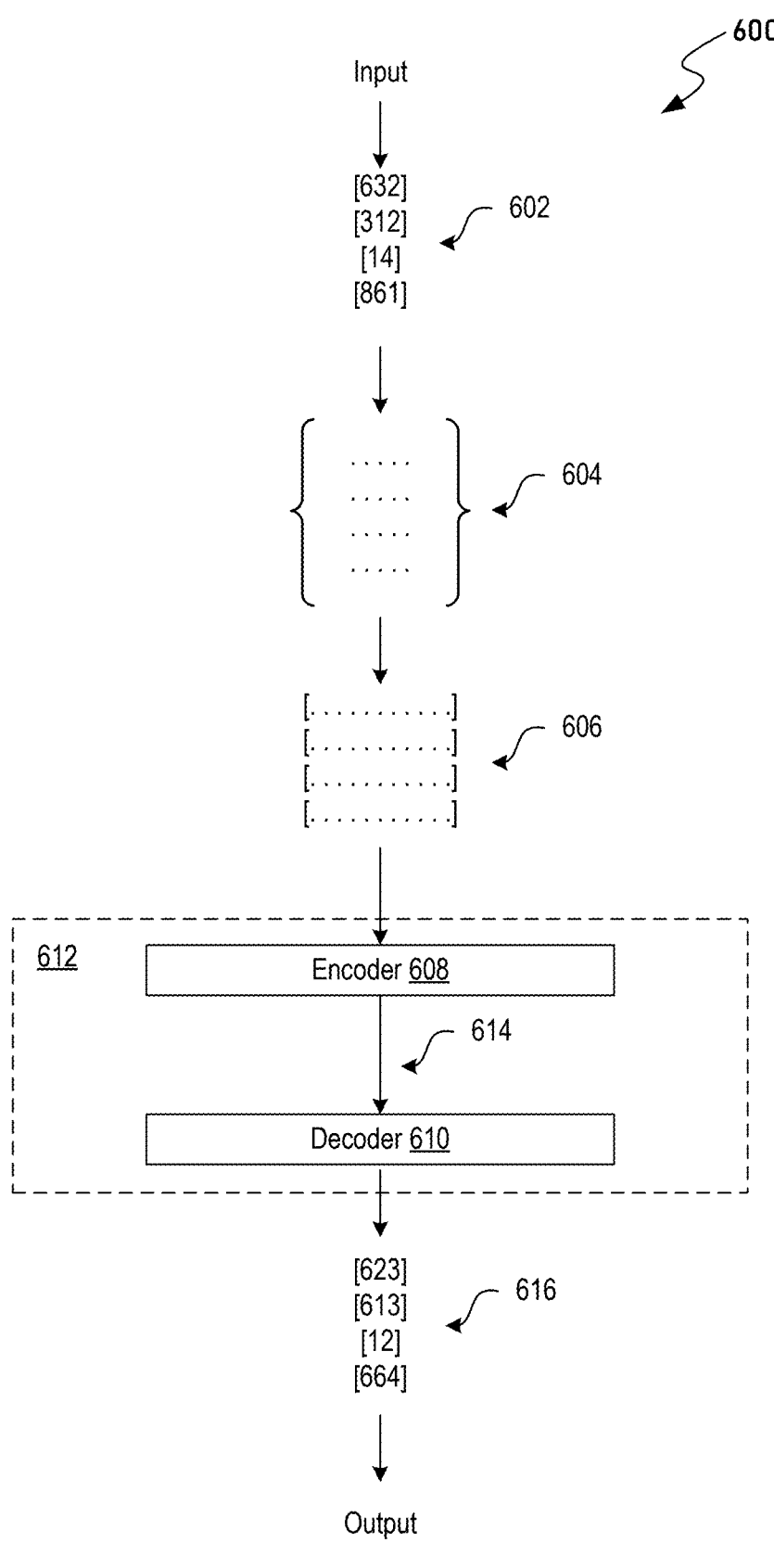
FIG. 6 is a block diagram of an example transformer.

To assist in understanding the present disclosure, some concepts relevant to artificial intelligence (AI) 600 in FIG. 6 including neural networks and machine learning (ML) are discussed herein. As described in this application, AI 600 can be used to analyze content of multiple messages to determine grouping of the multiple messages and/or to suggest a visual indicator for the grouping of the multiple messages.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term "DNN" can encompass any neural network having multiple layers, including CNNs, recurrent neural networks (RNNs), multilayer perceptrons (MLPs), generative adversarial networks (GANs), variational autoencoders (VAEs), and autoregressive models, among others.

DNNs are often used as ML-based models for modeling complex behaviors (e.g., human language, image recognition, object classification, etc.) in order to improve the accuracy of outputs (e.g., more accurate predictions), for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), may represent a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimizing a loss or maximizing a reward) in order to bring the output value as close to the target value as possible. The goal of training the ML model typically is to minimize a loss function or maximize a reward function.

The training data can be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performance-trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as "training." Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML-based language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistants).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 6 is a block diagram of an example transformer 612. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 612 includes an encoder 608 (which can include one or more encoder layers/blocks connected in series) and a decoder 610 (which can include one or more decoder layers/blocks connected in series). Generally, the encoder 608 and the decoder 610 each include multiple neural network layers, at least one of which can be a self-attention layer. The parameters of the neural network layers can be referred to as "the parameters of the language model."

The transformer 612 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 6 illustrates an example of how the transformer 612 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as "tokens" (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, and other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 612 can be of any length up to a maximum length defined based on the dimensions of the transformer 612. Each token 602 in the token sequence is converted into an embedding vector 606 (also referred to as "embedding 606").

An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some implementations, the numerical value of the token 602 can be used to look up the corresponding embedding in an embedding matrix 604, which can be learned during training of the transformer 612.

The generated embeddings 606 are input into the encoder 608. The encoder 608 serves to encode the embeddings 606 into feature vectors 614, or embedding vectors, that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as a "latent space" or "feature space."

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 can generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some implementations, the input provided to the transformer 612 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use autoregression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as Chat GPT 40, Bard, Llama, Bing Chat, Copilot, Ernie, Falcon 40B, Galactica, and Lamda, via a software interface (e.g., an application programming interface—"API"). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a "prompt," which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a "zero-shot prompt."

Computer System

Figure 7:
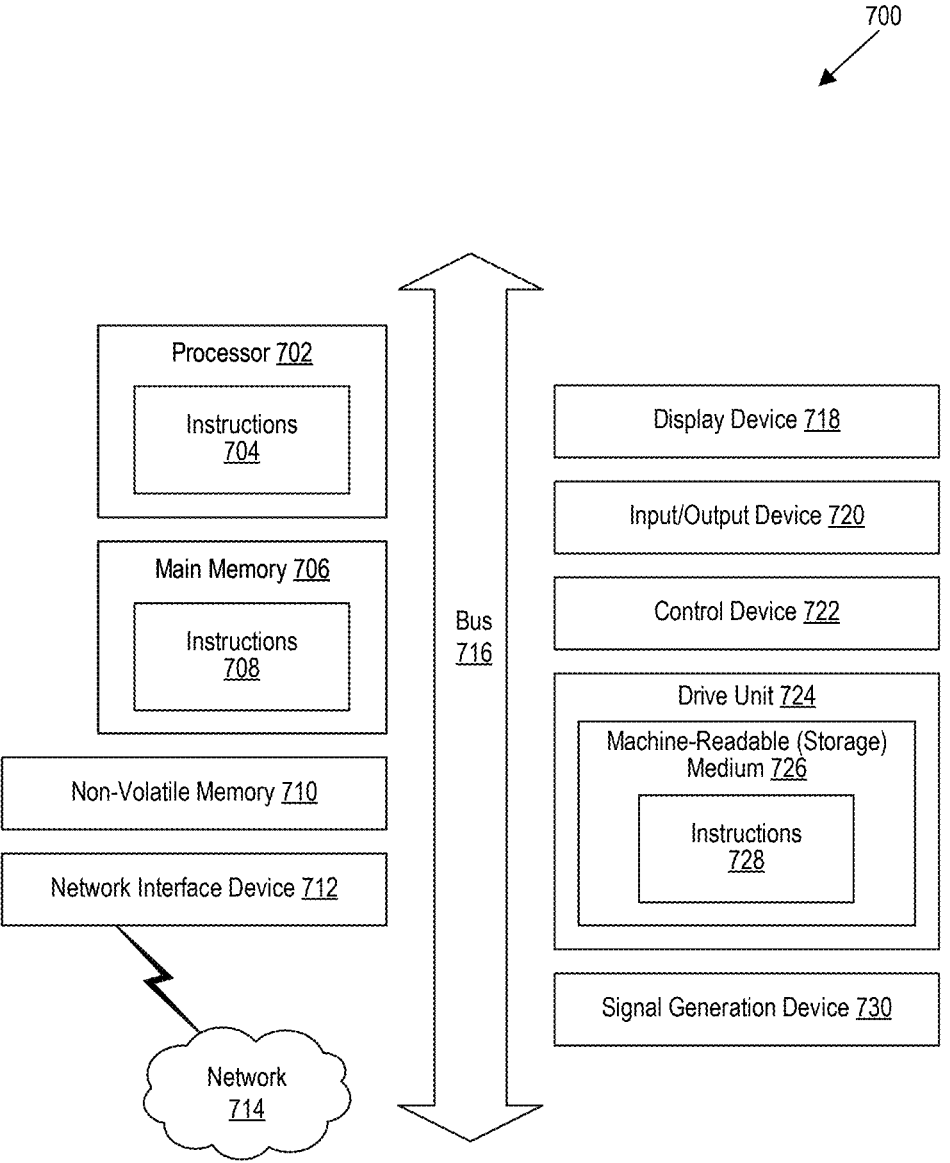
FIG. 7 is a block diagram that illustrates an example of a computer system 700 in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer (SBC) system, or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable (storage) medium 726) can be local, remote, or distributed. Although shown as a single medium, the machine-readable (storage) medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable (storage) medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Figure 8:
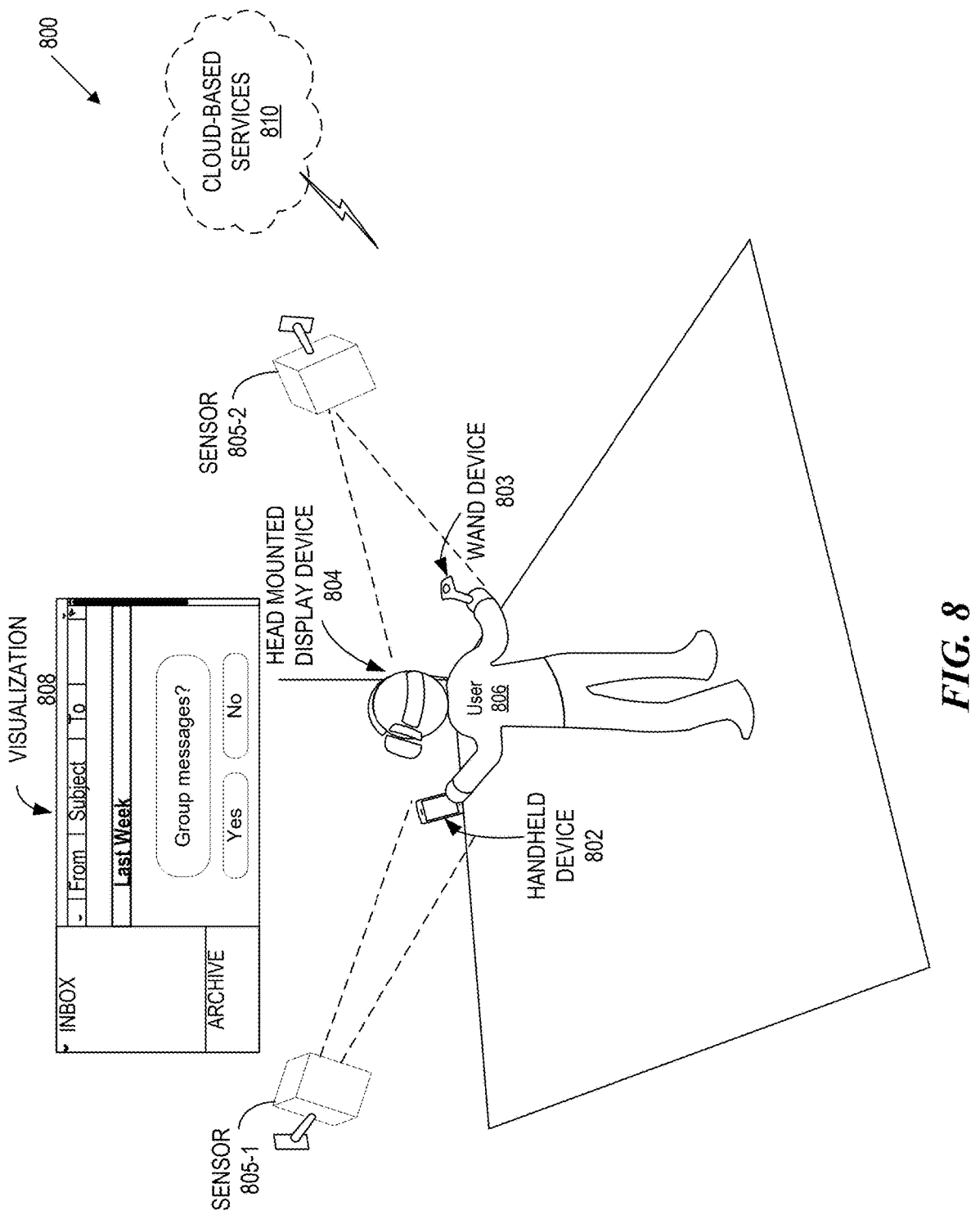
FIG. 8 illustrates a user engaged with a mixed reality system for immersive message management.

FIG. 8 illustrates a user engaged with a mixed reality system 800 for immersive message management. The components of the system 800 can include a handheld device 802 that administers a session running on other components of the system 800 including a head-mounted display (HMD) device 804 that renders a partial or full 360-degree interface. The system 800 can also include motion or position sensors 805-1 and 805-2, which are fixed in a room or worn by the user 806 such as, for example, sensors of wearables. The HMD device 804 can be an AR/VR/XR device. In some embodiments, the HMD device 804 can include glasses.

A near-eye display device, commonly referred to as an "HMD device," is an optical apparatus designed to present visual information directly in front of the user's eyes. This technology is composed of several integral components that work in unison to deliver a seamless and immersive visual experience.

Central to the near-eye display device lies the optical module. The optical module includes lenses and other optical elements that project images from a microdisplay or similar image source directly into the user's eyes. The optical module is engineered to ensure that the images are clear, focused, and appear at a comfortable viewing distance, thereby enhancing the overall user experience.

The microdisplay is a small yet high-resolution display panel responsible for generating the visual content. Utilizing technologies such as Liquid Crystal Display (LCD), Organic Light-Emitting Diode (OLED), Liquid Crystal on Silicon (LCoS), or Digital Light Processing (DLP), the microdisplay renders the images or video content that the user perceives.

Supporting these components is the frame and housing, which provides the structural integrity needed to hold the optical module and microdisplay in place. Designed to be lightweight and comfortable for extended wear, the frame often includes adjustable straps or other mechanisms to ensure a secure and personalized fit on the user's head.

Modern near-eye display devices are equipped with an array of sensors, including accelerometers, gyroscopes, magnetometers, and eye-tracking sensors. These sensors enable head tracking, motion detection, and gaze tracking, significantly enhancing the interactivity and immersive nature of the device. The data collected by these sensors is processed by a built-in or connected processing unit, which handles the computation required for rendering images, processing sensor data, and managing user inputs. This processing unit may be integrated into the device or connected via a wired or wireless link to an external computer or mobile device.

Connectivity interfaces such as universal serial bus (USB), High-Definition Multimedia Interface (HDMI), Bluetooth, or Wi-Fi are also integral to the device, allowing it to interface with external devices, transfer data, or receive content. The power supply, typically a battery or power management system, provides the necessary energy to operate the device efficiently, supporting extended usage without frequent recharging.

User interaction with the near-eye display device is facilitated through various user interface options, including physical buttons, touchpads, voice control, or gesture recognition systems. Additionally, some devices feature integrated speakers or headphone jacks to provide audio output, further enhancing the multimedia experience.

As illustrated, the handheld device 802 operates as a wand to navigate objects of the visualization 808 experienced by the user 806 through the HMD device 804. A dedicated wand device 803 (e.g., with one or more dedicated hardware buttons) can additionally or alternatively be used for navigation. In another example, the sensors 805-1 and 805-2 can detect the position and/or movement of the user's finger in the air to perform the functions including the examples illustrated in FIGS. 1 through 4, which could be rendered in a mixed reality session, e.g., on the handheld device 802. For example, the queries regarding grouping of messages, or the queries regarding visualizations of group messages, can be presented to the user 806 through the visualization 808.

In some embodiments, some components of the system 800 are remotely located from the user. For example, cloud components can provide cloud-based services 810 to administer the mixed reality session running on the components of the system 800 or provide services or content for a mixed reality session. Hence, administration of a mixed reality session could be through the HMD device 804, augmented with the handheld device 802, and/or with the cloud-based services 810 that receives session progress feedback (e.g., anywhere outside of a room where the user is experiencing a simulation).

As shown, the HMD device 804 can provide content (e.g., visualization 808) of a mixed reality session and process feedback from the user via the handheld device 802 to navigate the visualization 808. As shown, the HMD device 804 is a near-to-eye display system that is worn by the user 806. For example, the HMD device 804 can have a chassis and various electrical and optical components to enable an immersive experience by the user 806 wearing the HMD device 804. For example, the HMD device 804 can include a display for each of the user's eyes. The displays can render a real-world scene of a simulation for view by the user's eyes when the HMD device 804 is worn by the user. The HMD device 804 can also include a camera mounted on the chassis. The camera can capture movement of the user's pupils for physiological feedback responsive to simulated scenes being rendered. The HMD device 804 may also include a network interface, enabling the handheld device 802 to communicatively couple to the HMD device 804 over a wireless connection.

In some embodiments, the HMD device 804 includes features for measuring the user's physiological activity. For example, the HMD device 804 can include components to measure the user's electrical brain activity. As such, the HMD device 804 can collect physiological data in combination with any direct input by the user. In some embodiments, the physiological data can be used to supplement the user's conscious inputs. In some embodiments, the physiological data could be used to compare against the user's conscious input.

In one example, the HMD device 804 can render a virtual immersive environment by displaying images in view of the user's eyes such that the user can only see the images (e.g., visualization 808) and see nothing of the real world. The HMD device 804 can also render an AR environment. As such, the user can see the visualization 808 overlaying the real world while the HMD device 804 is worn by the user 806. Hence, to achieve an AR environment, the user in an augmented reality simulation has a transparent view with digital objects overlaid or superimposed on the user's real-world view.

Examples of the sensors 805-1 and 805-2 include cameras or motion detectors that are positioned proximate to the user such that the sensors 805-1 and 805-2 can obtain real-world feedback responsive to interactions with a simulated real-world scene. For example, cameras facing the user can detect the user's 806 movement while the user is engaged in a simulation and provide feedback to the HMD device 804 administering the simulation. The handheld device 802 can be used by the user 806 to submit input, which can include actuating buttons for the user 806 to input data and/or accelerometers that detect spatial movement. For example, the user 806 can move the handheld device 802 to provide inputs responsive to a scene administered by the HMD device 804.

The visualization 808 is one example of many that can be rendered in a mixed reality session. FIGS. 1-4 show examples of visualizations that could likewise be rendered in a mixed reality session. The user 806 can select and move objects of the visualization 808 in a manner described with respect to FIGS. 1-4. As described further below, the system 800 can include servers that are remotely located from the user 806 and can access a program administered by the HMD device 804. Further, a local software generation and distribution framework can be used to rapidly scale content. The core components and services can support complex user and session elements that can be easily managed by a service provider. As such, a platform of a mixed reality system can standardize interaction elements such as a session landing, sign-in, navigation rules, and the like. A top-level abstraction layer can support customization such as a sequence of sessions or scenes or conditional ordering of sessions or scenes. Services can include authentication, tracking, reports, user services, help services, pause and resume services, and the like.

Figure 9:
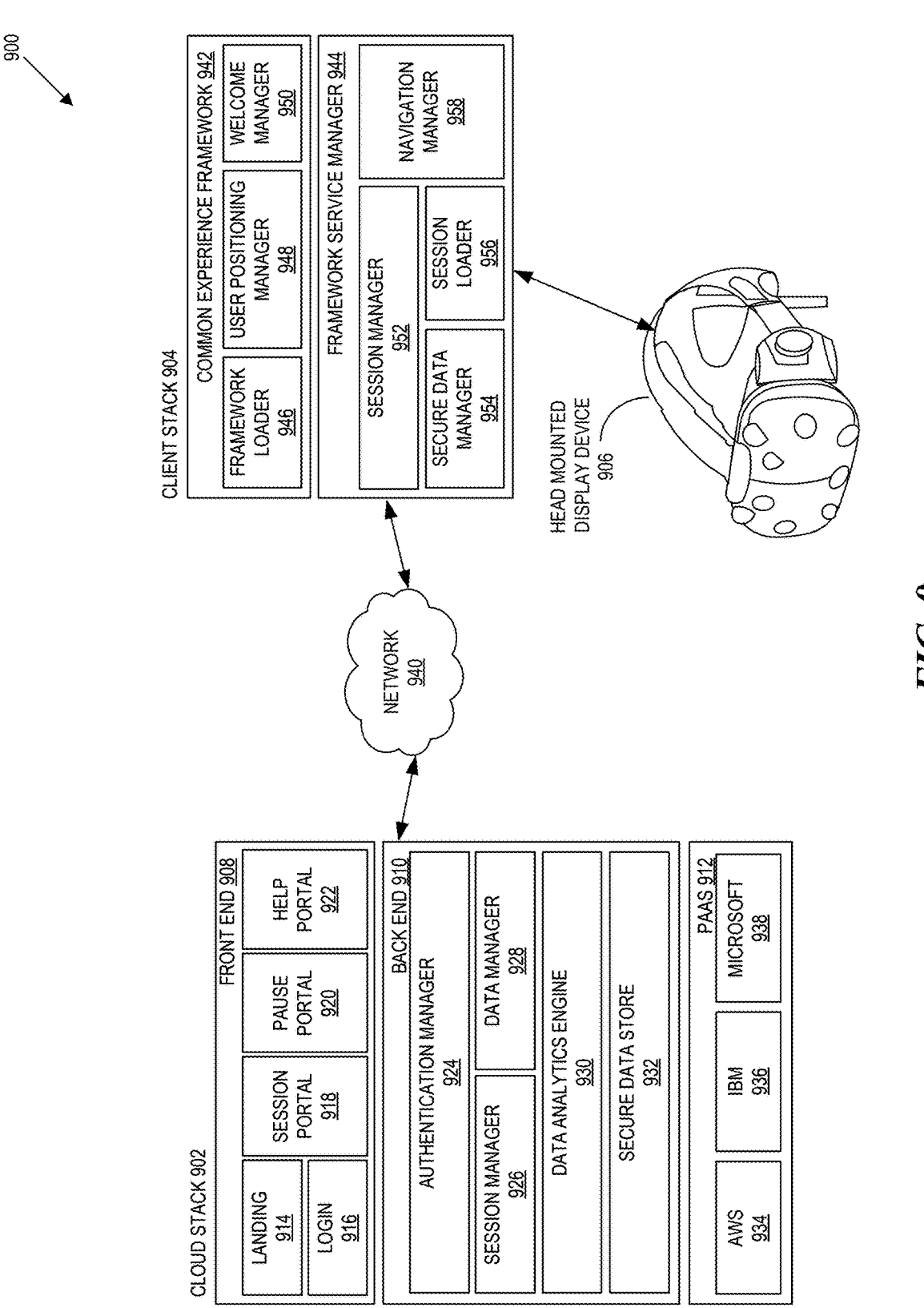
FIG. 9 is a block diagram illustrating a cloud stack and a client stack architecture for a platform that can collectively administer a mixed reality session on an HMD device.

FIG. 9 is a block diagram illustrating a cloud stack 902 and a client stack 904 architecture for a platform 900 that can collectively administer a mixed reality session on an HMD device 906. As shown, the cloud stack 902 includes three primary layers: a front end layer 908, a back end layer 910, and a platform as a service (PaaS) layer 912. The front end layer 908 includes a landing component 914 and a login component 916. The two components 914 and 916 are executed at the beginning of a session administered to orient a user and seek login credentials to control access to message programs and user information of the platform 900. The front end layer 908 also includes a session portal 918, pause portal 920, and help portal 922. The session portal 918 is for normal front-facing operations of a simulation session whereas the pause portal 920 is for operations while the session is paused. Lastly, the help portal 922 can help the user or administrator to address questions related to the platform 900 or simulation.

The back end layer 910 includes an authentication manager 924 that can authenticate a user and/or an administrator of the platform 900. A session manager 926 can manage access to a particular session. A data manager 928 can manage user data and/or data about the session such as any feedback from users while engaged in sessions. For example, the data manager 928 can collect feedback data from multiple users including their inputs and physiological data. A data analytics engine 930 can process the collected data to determine the actions of users and to learn how to improve the sessions (e.g., mixed reality scenes). A secure data store 932 can store sensitive data such as data that identifies users. Lastly, the PaaS layer 912 includes cloud computing services that provide the platform 900 for clients to administer the mixed reality sessions. Examples include AMAZON WEB SERVICES (AWS) 934 or services provided by IBM 936 and/or MICROSOFT 938.

The cloud stack 902 is communicatively connected to the client stack 904 over a network 940 such as the Internet. The client stack 904 includes a common experience framework layer 942 and a framework service manager layer 944. The common experience framework layer 942 includes a framework loader 946 to load the framework for a session, a user positioning manager 948 to monitor and track the relative position of the user engaged with the session, and a welcome manager 950 to orient the user at the beginning of the session.

The framework service manager layer 944 includes a session manager 952 to manage the session experienced by a user wearing the HMD device 906. The framework service manager layer 944 also includes a secure data manager 954 to store or anonymize any sensitive data, session loader 956 for loading a session, and a navigation manager 958 for navigating a user through mixed reality scenes of a message management program. The platform 900 is merely illustrative to aid the reader in understanding an embodiment. Other embodiments may include fewer or additional layers/components known to persons skilled in the art but omitted for brevity.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above and any that may be listed in accompanying filing papers are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

obtain a contact associated with a user;

obtain multiple images representing the contact by searching multiple datastores of images, wherein one or more images among the multiple images is retrieved by searching a first datastore of images among the multiple datastores of images, wherein a second image among the multiple images is retrieved by searching a second datastore of images among the multiple datastores of images;

obtain a first rule indicating precedence among the one or more images from the first datastore, and a second rule indicating precedence among the first datastore and the second datastore, wherein the first rule indicates which image to select among the one or more images when there are multiple images from the first datastore, wherein the second rule indicates that when there are one or more images from the first datastore the first datastore takes precedence over the second datastore;

based on the second rule, select the one or more images from the first datastore;

determine whether to present the one or more images from the first datastore in a graphical user interface (GUI) by:

determining, by a processor, an amount of communication between the contact and the user;

determining, by the processor, whether an amount of communication between the contact and the user is above a predetermined threshold;

upon determining that the amount of communication between the contact and the user is above the predetermined threshold:

automatically providing the one or more images associated with one or more most used contacts in the GUI based on the determined amount of communication;

receiving, via the GUI, a user selection of a third image among the one or more images from the first datastore, wherein the user selection indicates to organize the contact and the third image in the GUI based on specific criteria, wherein the specific criteria includes indicating a sender of a communication between the user and the contact, without requiring the user to read a text indicating the sender of the communication;

presenting, in the GUI, the text indicating the sender of the communication associated with the contact along with the third image, wherein the text indicating the sender of communication and the third image indicates the contact associated with the communication without requiring the user to read the text indicating the sender;

upon determining that the contact does not communicate with the user above the predetermined threshold:

based on the first rule, select an image among the one or more images from the first datastore; and present the contact along with the image.

2. The non-transitory, computer-readable storage medium of claim 1, comprising instructions to:

obtain the first rule indicating precedence among the one or more images from the first datastore, wherein the first rule indicates when there are multiple images from the first datastore to select an image among the one or more images at random.

3. The non-transitory, computer-readable storage medium of claim 1, comprising instructions to:

obtain a second contact associated with the user;

determine whether the second contact is associated with a fourth image;

upon determining that the second contact is not associated with the fourth image, determine whether the second contact communicates with the user above the predetermined threshold;

upon determining that the second contact is not associated with the fourth image, and that the second contact communicates with the user above the predetermined threshold obtain a fourth multiplicity of images representing the second contact; and present the second contact along with the fourth multiplicity of images.

4. The non-transitory, computer-readable storage medium of claim 1, comprising instructions to:

obtain multiple contacts including the contact;

identify a group of contacts among the multiple contacts, wherein each contact among the group of contacts includes a matching attribute;

obtain an image associated with the matching attribute by searching the multiple datastores; and present each contact among the multiple contacts along with the image associated with the matching attribute.

5. The non-transitory, computer-readable storage medium of claim 1, comprising instructions to:

obtain a social media post associated with the contact;

provide the social media post to an artificial intelligence trained to generate an image; and obtain from the artificial intelligence the image representing the contact.

6. The non-transitory, computer-readable storage medium of claim 1, comprising instructions to:

present the contact along with the image on a virtual reality, augmented reality, or mixed reality device; and obtain an indication from the user to change the image from a wand device associated with the virtual reality, augmented reality, or mixed reality device.

7. A method comprising:

obtaining a contact associated with a user;

obtaining multiple visual representations representing the contact by searching multiple datastores of visual representations, wherein one or more visual representations among the multiple visual representations is retrieved by searching a first datastore of visual representations among the multiple datastores of visual representations, wherein a second visual representation among the multiple visual representations is retrieved by searching a second datastore of visual representations among the multiple datastores of visual representations;

obtaining a first rule indicating precedence among the one or more visual representations from the first datastore, and a second rule indicating precedence among the first datastore and the second datastore, wherein the first rule indicates which visual representation to select among the one or more visual representations when there are multiple visual representations from the first datastore, wherein the second rule indicates that when there are one or more visual representations from the first datastore the first datastore takes precedence over the second datastore;

based on the second rule, selecting the one or more visual representations from the first datastore;

determining whether to present the one or more visual representations from the first datastore in a graphical user interface (GUI) by:

determining, by a processor, an amount of communication between the contact and the user;

determining, by the processor, whether an amount of communication between the contact and the user is above a predetermined threshold;

upon determining that the amount of communication between the contact and the user is above the predetermined threshold:

automatically providing the one or more visual representations associated with one or more most used contacts in the GUI based on the determined amount of communication;

receiving, via the GUI, a user selection of a third visual representation among the one or more visual representations from the first datastore, wherein the user selection indicates to organize the contact and the third visual representation in the GUI based on specific criteria, wherein the specific criteria includes indicating a sender of a communication between the user and the contact, without requiring the user to read a text indicating the sender of the communication;

presenting, in the GUI, the text indicating the sender of the communication associated with the contact along with the third visual representation, wherein the text indicating the sender of communication and the third visual representation indicates the contact associated with the communication without requiring the user to read the text indicating the sender;

upon determining that the contact does not communicate with the user above the predetermined threshold:

based on the first rule, selecting a visual representation among the one or more visual representations from the first datastore; and present the contact along with the visual representation.

8. The method of claim 7, comprising:

obtaining the first rule indicating precedence among the one or more visual representations from the first datastore, wherein the first rule indicates when there are multiple visual representations from the first datastore to select a visual representation among the one or more visual representations at random.

9. The method of claim 7, comprising:

obtaining a second contact associated with a user;

determining whether the second contact is associated with a fourth visual representation;

upon determining that the second contact is not associated with the fourth visual representation, determining whether the second contact communicates with the user above the predetermined threshold;

upon determining that the second contact is not associated with the fourth visual representation, and that the second contact communicates with the user above the predetermined threshold obtaining a third multiplicity of visual representations representing the second contact; and presenting the second contact along with the third multiplicity of visual representations.

10. The method of claim 7, comprising:

obtaining multiple contacts including the contact;

identifying a group of contacts among the multiple contacts, wherein each contact among the group of contacts includes a matching attribute;

obtaining a visual representation associated with the matching attribute by searching the multiple datastores; and presenting each contact among the multiple contacts along with the visual representation associated with the matching attribute.

11. The method of claim 7, comprising:

obtaining a social media post associated with the contact;

providing the social media post to an artificial intelligence trained to generate a visual representation; and obtaining from the artificial intelligence the visual representation representing the contact.

12. The method of claim 7, comprising:

presenting the contact along with the visual representation on a virtual reality, augmented reality, or mixed reality device; and obtaining an indication from the user to change the visual representation from a wand device associated with the virtual reality, augmented reality, or mixed reality device.

13. A system comprising:

at least one hardware processor; and at least one non-transitory memory storing instructions, which, when executed by the at least one hardware processor, cause the system to:

obtain a contact associated with a user;

obtain multiple visual representations representing the contact by searching multiple datastores of visual representations, wherein one or more visual representations among the multiple visual representations is retrieved by searching a first datastore of visual representations among the multiple datastores of visual representations, wherein a second visual representation among the multiple visual representations is retrieved by searching a second datastore of visual representations among the multiple datastores of visual representations;

obtain a first rule indicating precedence among the one or more visual representations from the first datastore, and a second rule indicating precedence among the first datastore and the second datastore, wherein the first rule indicates which visual representation to select among the one or more visual representations when there are multiple visual representations from the first datastore, wherein the second rule indicates that when there are one or more visual representations from the first datastore the first datastore takes precedence over the second datastore;

based on the second rule, select the one or more visual representations from the first datastore;

determining whether to present the one or more visual representations from the first datastore in a graphical user interface (GUI) by:

determine, by a processor, an amount of communication between the contact and the user;

determining, by the processor, whether an amount of communication between the contact and the user is above a predetermined threshold;

upon determining that the amount of communication between the contact and the user is above the predetermined threshold:

automatically providing the one or more visual representations associated with one or more most used contacts in the GUI based on the determined amount of communication;

receiving, via the GUI, a user selection of a third visual representation among the one or more visual representations from the first datastore, wherein the user selection indicates to organize the contact and the third visual representation in the GUI based on specific criteria, wherein the specific criteria includes indicating a sender of a communication between the user and the contact, without requiring the user to read a text indicating the sender of the communication;

presenting, in the GUI, the text indicating the sender of the communication associated with the contact along with the third visual representation, wherein the text indicating the sender of communication and the third visual representation indicates the contact associated with the communication without requiring the user to read the text indicating the sender;

upon determining that the contact does not communicate with the user above the predetermined threshold:

based on the first rule, select a visual representation among the one or more visual representations from the first datastore; and present the contact along with the visual representation.

14. The system of claim 13, comprising instructions to:

obtain the first rule indicating precedence among the one or more visual representations from the first datastore, wherein the first rule indicates when there are multiple visual representations from the first datastore to select a visual representation among the one or more visual representations at random.

15. The system of claim 13, comprising instructions to:

obtain a second contact associated with a user;

determine whether the second contact is associated with a fourth visual representation;

upon determining that the second contact is not associated with the fourth visual representation, determine whether the second contact communicates with the user above the predetermined threshold;

upon determining that the second contact is not associated with the fourth visual representation, and that the second contact communicates with the user above the predetermined threshold obtain a third multiplicity of visual representations representing the second contact; and present the second contact along with the third multiplicity of visual representations.

16. The system of claim 13, comprising instructions to:

obtain multiple contacts including the contact;

identify a group of contacts among the multiple contacts, wherein each contact among the group of contacts includes a matching attribute;

obtain a visual representation associated with the matching attribute by searching the multiple datastores; and present each contact among the multiple contacts along with the visual representation associated with the matching attribute.

17. The system of claim 13, comprising instructions to:

obtain a social media post associated with the contact;

provide the social media post to an artificial intelligence trained to generate a visual representation; and obtain from the artificial intelligence the visual representation representing the contact.

18. The system of claim 13, comprising instructions to:

present the contact along with the visual representation on a virtual reality, augmented reality, or mixed reality device; and obtain an indication from the user to change the visual representation from a wand device associated with the virtual reality, augmented reality, or mixed reality device.

* * * * *